US012736506B2

(12) United States Patent
Tanaka

(10) Patent No.: US 12,736,506 B2
(45) Date of Patent: Sep. 15, 2026

(54) FLUID PORT STRUCTURE AND SAMPLE SUPPLY DEVICE

(71) Applicant: SHIMADZU CORPORATION, Kyoto (JP)

(72) Inventor: Shinji Tanaka, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 279 days.

(21) Appl. No.: 18/607,432

(22) Filed: Mar. 16, 2024

(65) Prior Publication Data

US 2024/0319148 A1 Sep. 26, 2024

(30) Foreign Application Priority Data

Mar. 23, 2023 (JP) ................................ 2023-046942

(51) Int. Cl.
*G01N 30/60* (2006.01)
*B01D 15/14* (2006.01)
*G01N 30/16* (2006.01)

(52) U.S. Cl.
CPC ........... *G01N 30/606* (2013.01); *B01D 15/14* (2013.01); *G01N 30/16* (2013.01)

(58) Field of Classification Search
None
See application file for complete search history.

(56) References Cited

U.S. PATENT DOCUMENTS

2022/0026401 A1* 1/2022 Ando ..................... G01N 30/20
2022/0356964 A1* 11/2022 Yanagibayashi ....... G01N 30/38

FOREIGN PATENT DOCUMENTS

JP 7156395 B2 10/2022

* cited by examiner

*Primary Examiner* — Eric S. McCall
*Assistant Examiner* — Nigel H Plumb
(74) *Attorney, Agent, or Firm* — Renner, Otto, Boisselle & Sklar, LLP

(57) ABSTRACT

A fluid port structure includes a tube and a cylindrical portion and receives injection of a fluid. The tube has sealability. A flow path through which the fluid flows is formed in the tube. In the cylindrical portion, a through hole that extends in an axial direction in which the fluid flows is formed. An upstream end portion of the tube is inserted into the through hole. An inner peripheral surface of the cylindrical portion has a tapered surface, and the more upstream a position on the tapered surface than a predetermined position in the axial direction, the larger a diameter of the portion of the through hole. The tube has a widening portion that widens along the tapered surface of the cylindrical portion in the upstream end portion.

5 Claims, 6 Drawing Sheets

FLUID PORT STRUCTURE AND SAMPLE SUPPLY DEVICE

BACKGROUND

Technical Field

The present disclosure relates to a fluid port structure and a sample supply device.

Description of Related Art

A chromatograph has been known as an analysis device that separates a substance included in a sample into different components for measurement. In the chromatograph, a sample to be analyzed is supplied to an analysis flow path by an autosampler. For example, JP 7156395 B2 describes an autosampler having a needle for sampling and an injection port connected to an analysis flow path through a tube.

In the injection port, a needle seal is pressed against the upper surface of the tube, so that the liquid-tightness between the tube and the needle seal is maintained. Further, when a sample is supplied, the tip portion of a needle is brought into contact with the needle seal, so that the needle and the needle seal are in fluid connection with each other in a liquid-tight manner. In this state, the sample is discharged from the needle, thereby being supplied to the analysis flow path through the tube.

SUMMARY

Since the needle seal and its connecting member have relatively large thicknesses, the size of the injection port is increased. Further, since the process of processing the needle seal is complicated, the cost of the injection port is increased. Therefore, it is required to reduce the size and cost of the injection port.

An object of the present disclosure is to provide a fluid port structure and a sample supply device a size and cost of which can be reduced.

One aspect of the present disclosure relates to a fluid port structure that receives injection of a fluid and includes a tube having sealability and having a flow path through which the fluid passes, and a cylindrical portion having a through hole, which extends in an axial direction in which the fluid flows and through which an upstream end portion of the tube is inserted, wherein an inner peripheral surface of the cylindrical portion has a tapered surface, and the more upstream a position on the tapered surface than a predetermined position in the axial direction, the larger a diameter of the through hole, and the tube has a widening portion that widens along the tapered surface of the cylindrical portion in the upstream end portion.

Another aspect of the present disclosure relates to a sample supply device that includes the above-mentioned fluid port structure, and a sampling needle that injects a fluid sample to the flow path while being in contact with the widening portion of the tube in the fluid port structure.

With the present disclosure, it is possible to reduce the size and cost of the fluid port structure and the sample supply device.

Other features, elements, characteristics, and advantages of the present disclosure will become more apparent from the following description of preferred embodiments of the present disclosure with reference to the attached drawings.

DETAILED DESCRIPTION (1) Configuration of Chromatograph

Figure 1:
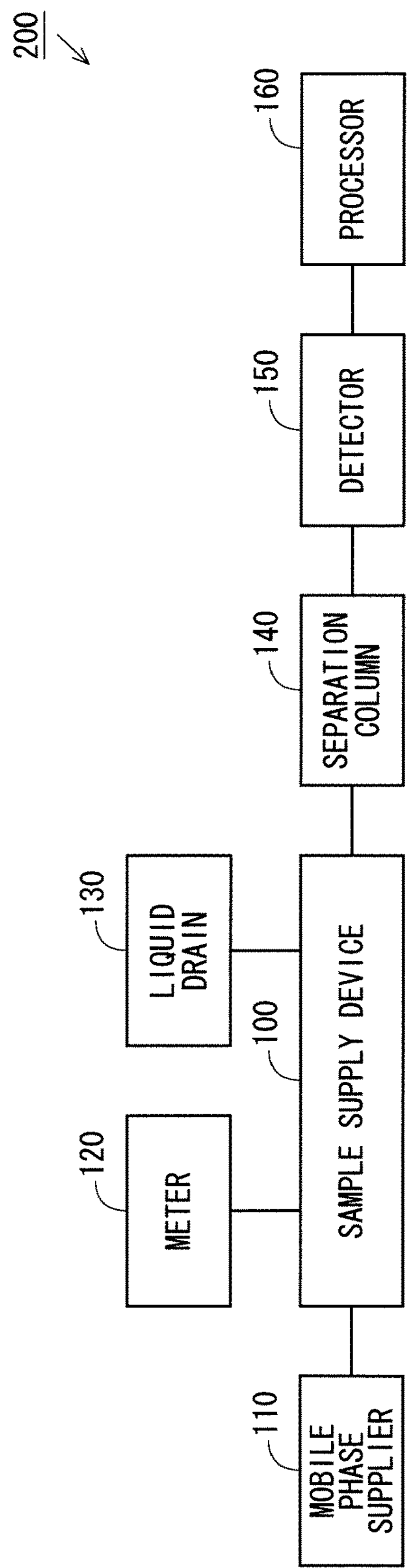
FIG. 1 is a block diagram showing the configuration of a chromatograph including a sample supply device according to one embodiment of the present disclosure.

A fluid port structure and a sample supply device according to embodiments of the present disclosure will be described below in detail with reference to the drawings. FIG. 1 is a block diagram showing the configuration of a chromatograph including a sample supply device according to one embodiment of the present disclosure. As shown in FIG. 1, in the present example, the chromatograph 200 is a liquid chromatograph (LC), and includes the sample supply device 100, a mobile phase supplier 110, a meter 120, a liquid drain 130, a separation column 140, a detector 150 and a processor 160.

The mobile phase supplier 110 includes a degassing device, a liquid sending pump or a mixer, for example. The mobile phase supplier 110 sucks a liquid mobile phase from one or more mobile phase containers (not shown) and supplies the sucked mobile phase. The meter 120 includes a syringe or a pump, for example. The liquid drain 130 is a drain, for example, and an unnecessary liquid is discarded to the liquid drain 130.

The sample supply device 100 sequentially performs a sucking operation and an injecting operation. During the sucking operation, the sample supply device 100 sucks a sample to be analyzed due to an operation of the meter 120. During the injecting operation, the sample supply device 100 supplies the sucked sample to the separation column 140 together with the mobile phase that has been supplied by the mobile phase supplier 110. Details of the sample supply device 100 will be described below.

The separation column 140 is accommodated in a column oven (not shown) and maintained to have a predetermined constant temperature. The separation column 140 separates the sample that has been supplied by the sample supply device 100 into components according to differences in chemical property or composition. The detector 150 detects the components into which the sample has been separated by the separation column 140 and outputs a detection signal indicating a detection intensity. The processor 160 generates a chromatogram representing the relationship between a retention time of each component of the sample and the detection intensity based on the detection signal that has been output by the detector 150.

Figure 2:
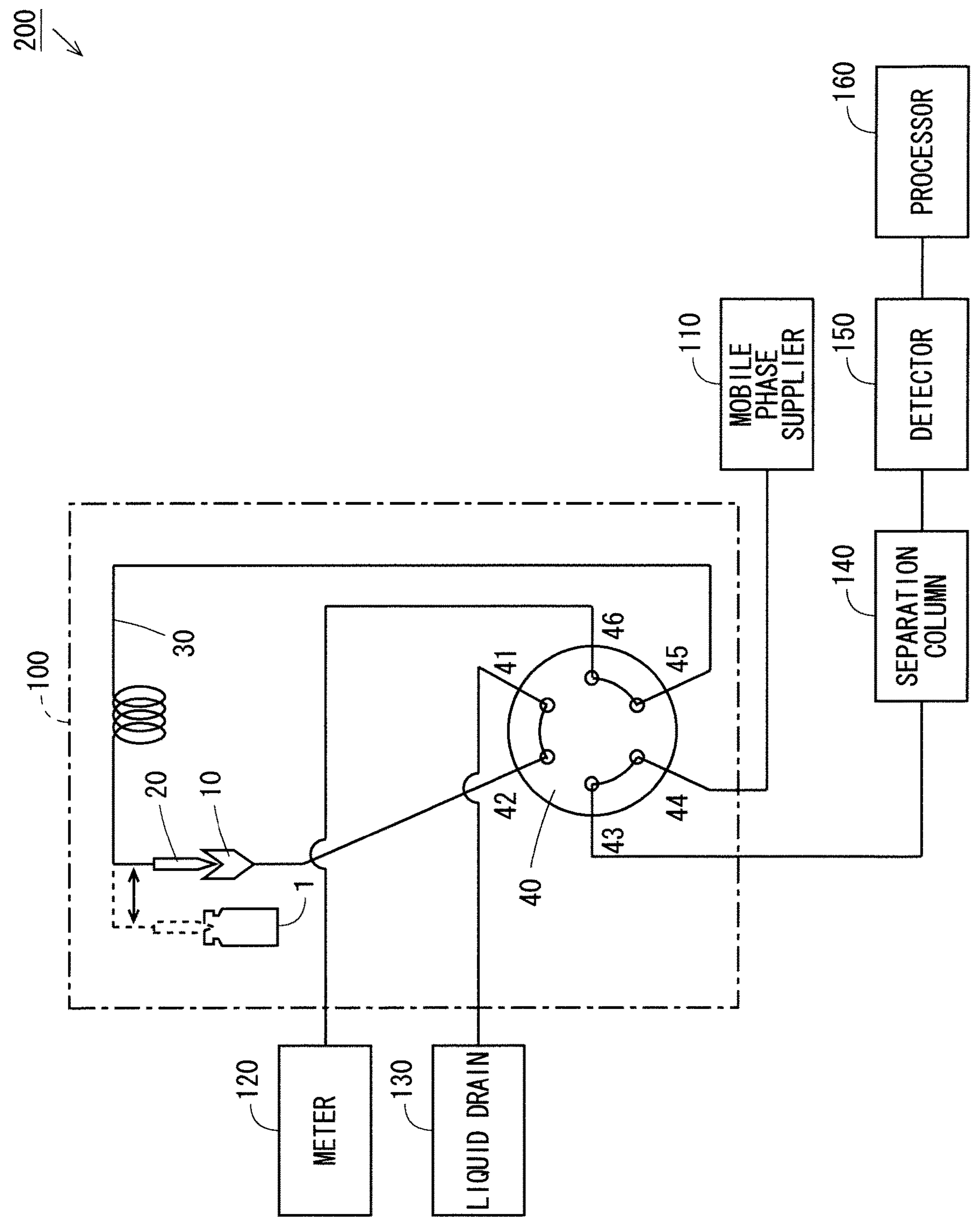
FIG. 2 is a block diagram of the chromatograph for explaining the configuration of the sample supply device.

FIG. 2 is a block diagram of the chromatograph 200 for explaining the configuration of the sample supply device 100. As shown in FIG. 2, the sample supply device 100 includes an injection port 10, a sampling needle 20, a sample loop 30 and a switching valve 40. The injection port 10 has a fluid port structure for receiving injection of a sample. Details of the injection port 10 will be described below.

The sampling needle 20 is an injection member for injecting a fluid into a flow path of the injection port 10, and is connected to one end portion of the sample loop 30. As indicated by the dotted lines in FIG. 2, the sampling needle 20 is movable between the injection port 10 and a vial 1 containing a sample by a transport device (not shown).

The switching valve 40 is a high-pressure valve, for example, and has six ports 41 to 46. The port 41 is connected to the liquid drain 130. The port 42 is connected to the injection port 10. The port 43 is connected to the separation column 140. The port 44 is connected to the mobile phase supplier 110. The port 45 is connected to the other end portion of the sample loop 30. The port 46 is connected to the meter 120.

The switching valve 40 is configured to be switchable between a first connection state and a second connection state. In the first connection state, the ports 41, 42 are connected to each other, the ports 43, 44 are connected to each other, and the ports 45, 46 are connected to each other. In the second connection state, the ports 42, 43 are connected to each other, the ports 44, 45 are connected to each other, and the ports 46, 41 are connected to each other.

Figure 3:
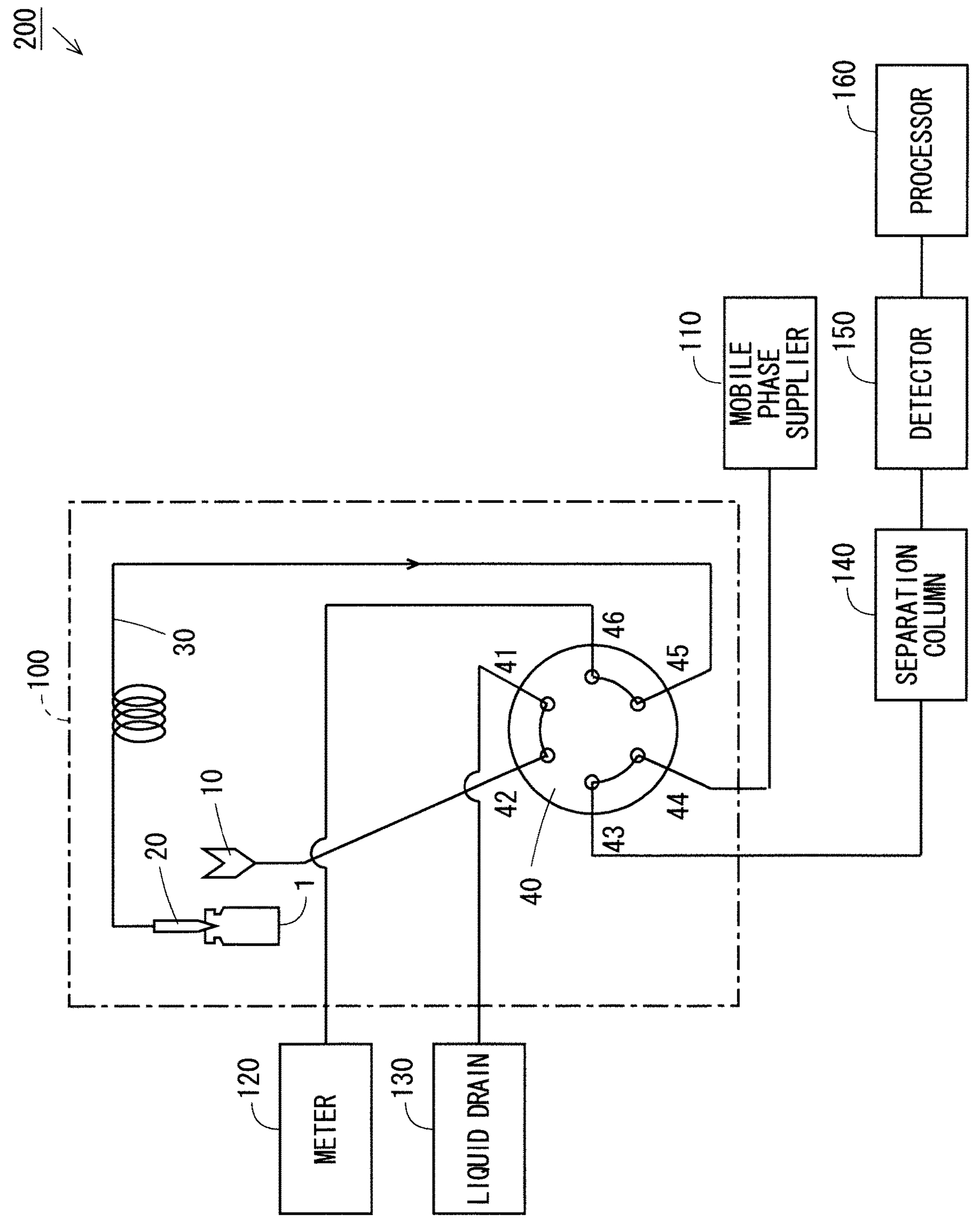
FIG. 3 is a diagram showing the sample supply device during a sucking operation.

FIG. 3 is a diagram showing the sample supply device 100 during the sucking operation. As shown in FIG. 3, during the sucking operation, the switching valve 40 is switched to the first connection state. In this case, the injection port 10 and the liquid drain 130 are connected to each other, the mobile phase supplier 110 and the separation column 140 are connected to each other, and the other end portion of the sample loop 30 and the meter 120 are connected to each other. Further, the tip of the sampling needle 20 is put in the vial 1. In this state, the meter 120 is driven, so that a predetermined volume of the sample in the vial 1 is sucked by the sampling needle 20. The sucked sample is temporarily held in the sample loop 30.

Figure 4:
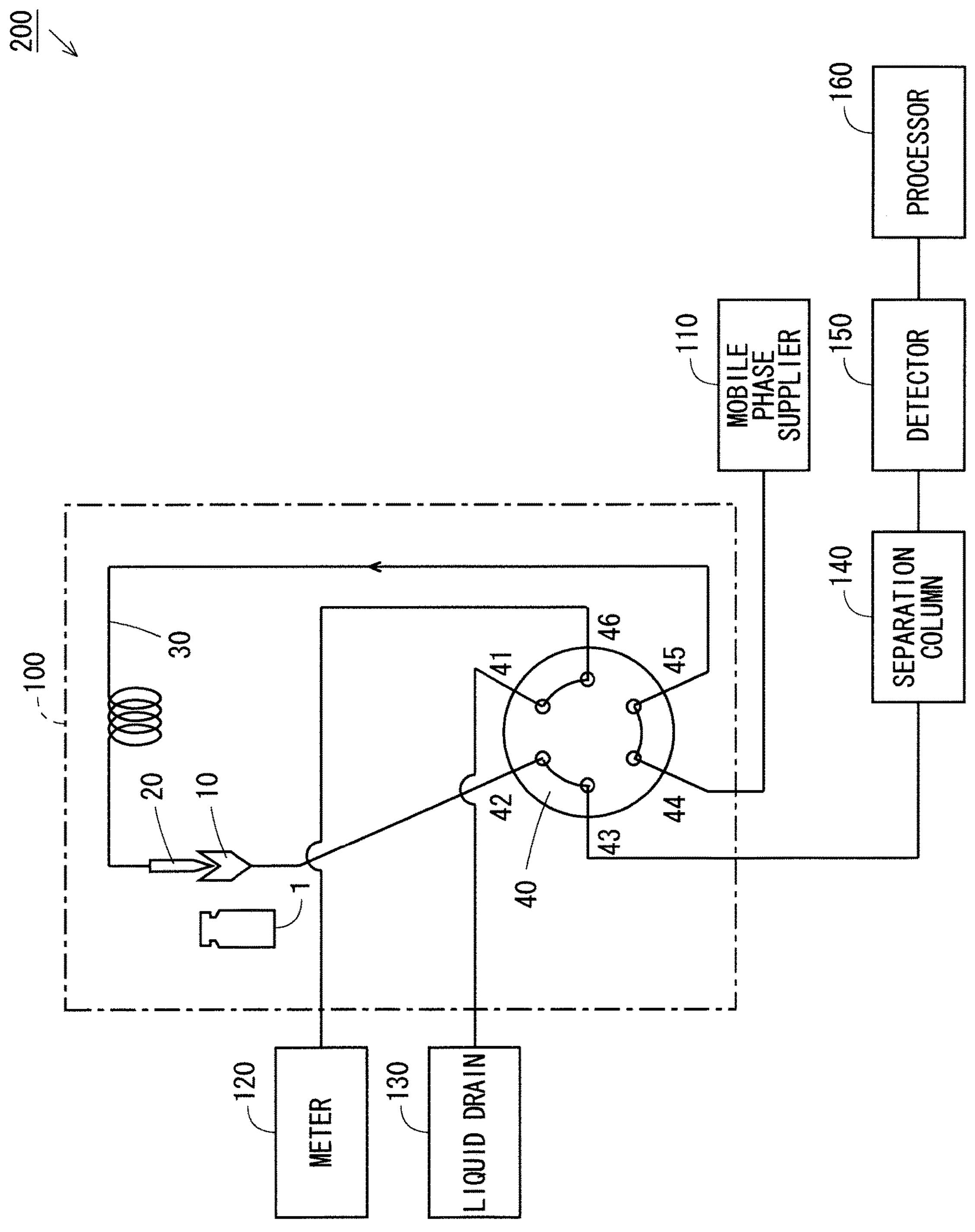
FIG. 4 is a diagram showing the sample supply device during an injecting operation.

FIG. 4 is a diagram showing the sample supply device 100 during the injecting operation. As shown in FIG. 4, during the injecting operation, the switching valve 40 is switched to the second connection state. In this case, the meter 120 and the liquid drain 130 are connected to each other, the mobile phase supplier 110 and the other end portion of the sample loop 30 are connected to each other, and the injection port 10 and the separation column 140 are connected to each other. Further, the tip of the sampling needle 20 is put in the injection port 10. In this state, the mobile phase is supplied by the mobile phase supplier 110, so that the sample held in the sample loop 30 is injected into the injection port 10 together with the mobile phase and supplied to the separation column 140.

(2) Injection Port

Figure 5:
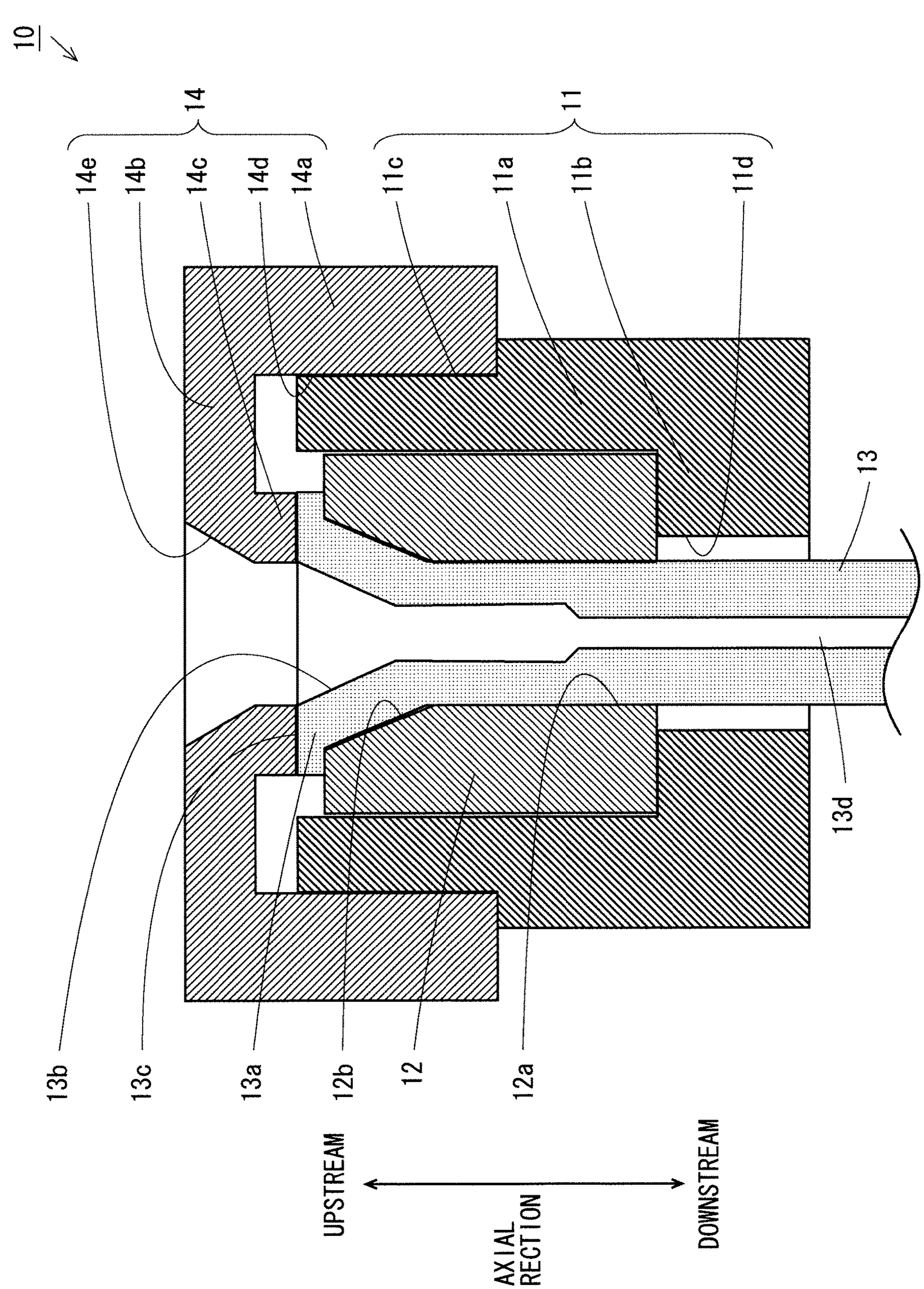
FIG. 5 is a longitudinal cross sectional view showing a fluid port structure of an injection port.

FIG. 5 is a longitudinal cross sectional view showing the fluid port structure of the injection port 10. As shown in FIG. 5, the injection port 10 includes a casing portion 11, a cylindrical portion 12, a tube 13 and a cap 14. In the following description, the direction parallel to the direction in which the mobile phase passes through the injection port 10 is referred to as an axial direction. Further, the direction in which the mobile phase flows is referred to as a downstream direction, and the opposite direction is referred to as an upstream direction.

The casing portion 11 is formed of a metallic material, for example. The casing portion 11 has a bottomed cylindrical shape including a cylindrical peripheral wall portion 11*a* extending in the axial direction and a circular bottom surface portion 11*b* closing the downstream end portion of the peripheral wall portion 11*a*. A thread 11*c* is formed at the outer peripheral surface of the upstream end portion of the peripheral wall portion 11*a*. A through hole 11*d* is formed in the center of the bottom surface portion 11*b*.

The cylindrical portion 12 is formed of a metallic material, for example. In the present example, the cylindrical portion 12 has a cylindrical shape extending in the axial direction. Therefore, a through hole 12*a* extending in the axial direction is formed in the center of the cylindrical portion 12. The outer diameter of the cylindrical portion 12 is slightly smaller than the inner diameter of the peripheral wall portion 11*a* of the casing portion 11. The cylindrical portion 12 is accommodated in the casing portion 11. While the upstream end surface of the cylindrical portion 12 is lower than the upstream end surface of the peripheral wall portion 11*a* in the example of FIG. 5, the embodiment is not limited to this.

In the vicinity of the upstream end surface of the cylindrical portion 12, the inner peripheral surface of the cylindrical portion 12 has a tapered surface 12*b* that is inclined outwardly. Therefore, the diameter of the through hole 12*a* is constant in a certain range from the downstream end surface toward the upstream end surface of the cylindrical portion 12. On the other hand, in the vicinity of the upstream end surface of the cylindrical portion 12, the closer a position on the tapered surface 12*b* to the upper stream end surface than the above-mentioned portion having the constant diameter, the larger the diameter of the through hole 12*a*. In the casing portion 11, the through hole 11*d* of the bottom surface portion 11*b* and the through hole 12*a* of the cylindrical portion 12 communicate with each other. While the through hole 12*a* is smaller than the through hole 11*d* in the example of FIG. 5, the embodiment is not limited to this.

The tube 13 is formed of a member having sealability. The tube 13 may be formed of a member having flexibility such as a resin material. In the present example, the tube 13 is formed of PEEK (polyether ether ketone). The tube 13 is inserted into the through hole 12*a* of the cylindrical portion 12 and the through hole 11*d* of the casing portion 11. The downstream end portion of the tube 13 is connected to the port 42 of the switching valve 40 of FIG. 2. The inside of the tube 13 serves as a flow path 13*d* through which the mobile phase and the sample flow.

The tube 13 has a widening portion 13*a* which widens along the tapered surface 12*b* of the cylindrical portion 12 at the upstream end portion. Therefore, the inner peripheral surface of the widening portion 13*a* of the tube 13 has a tapered surface 13*b* that is inclined outwardly. Further, the widening portion 13*a* has a cover portion 13*c* that covers at least part of the upstream end surface of the cylindrical portion 12. In the present example, a thermal process is performed on the upstream portion of the tube 13 with the tube 13 inserted into the cylindrical portion 12, so that the widening portion 13*a* is formed.

The cap 14 is formed of a metallic material, for example. The cap 14 has a peripheral wall portion 14*a*, an end surface portion 14*b* and a projecting portion 14*c*. The peripheral wall portion 14*a* has a cylindrical shape extending in the axial direction. A thread 14*d* corresponding to the thread 11*c* of the casing portion 11 is formed at the inner peripheral surface of the peripheral wall portion 14*a*. The end surface portion 14*b* is a circular plate member that closes the upstream end surface of the peripheral wall portion 14*a*. A through hole 14*e* extending in the axial direction is formed at the center of the end surface portion 14*b*. The diameter of the through hole 14*e* is larger than the outer diameter of the sampling needle 20. The projecting portion 14*c* projects downstream from the downstream end surface of the end surface portion 14*b* so as to surround the through hole 14*e*.

The thread 14*d* of the cap 14 is threadly engaged with the thread 11*c* of the casing portion 11, so that the cap 14 is attached to the casing portion 11. In this case, the cover portion 13*c* of the widening portion 13*a* of the tube 13 and the upstream end surface of the cylindrical portion 12 are pressed by the downstream end portion of the projecting portion 14*c*. Thus, the cylindrical portion 12 is fixed in the casing portion 11, and the widening portion 13*a* of the tube 13 is fixed to the upstream end surface of the cylindrical portion 12. In this state, the tapered surface 13*b* of the widening portion 13*a* of the tube 13 is exposed in the through hole 14*e* of the cap 14.

Figure 6:
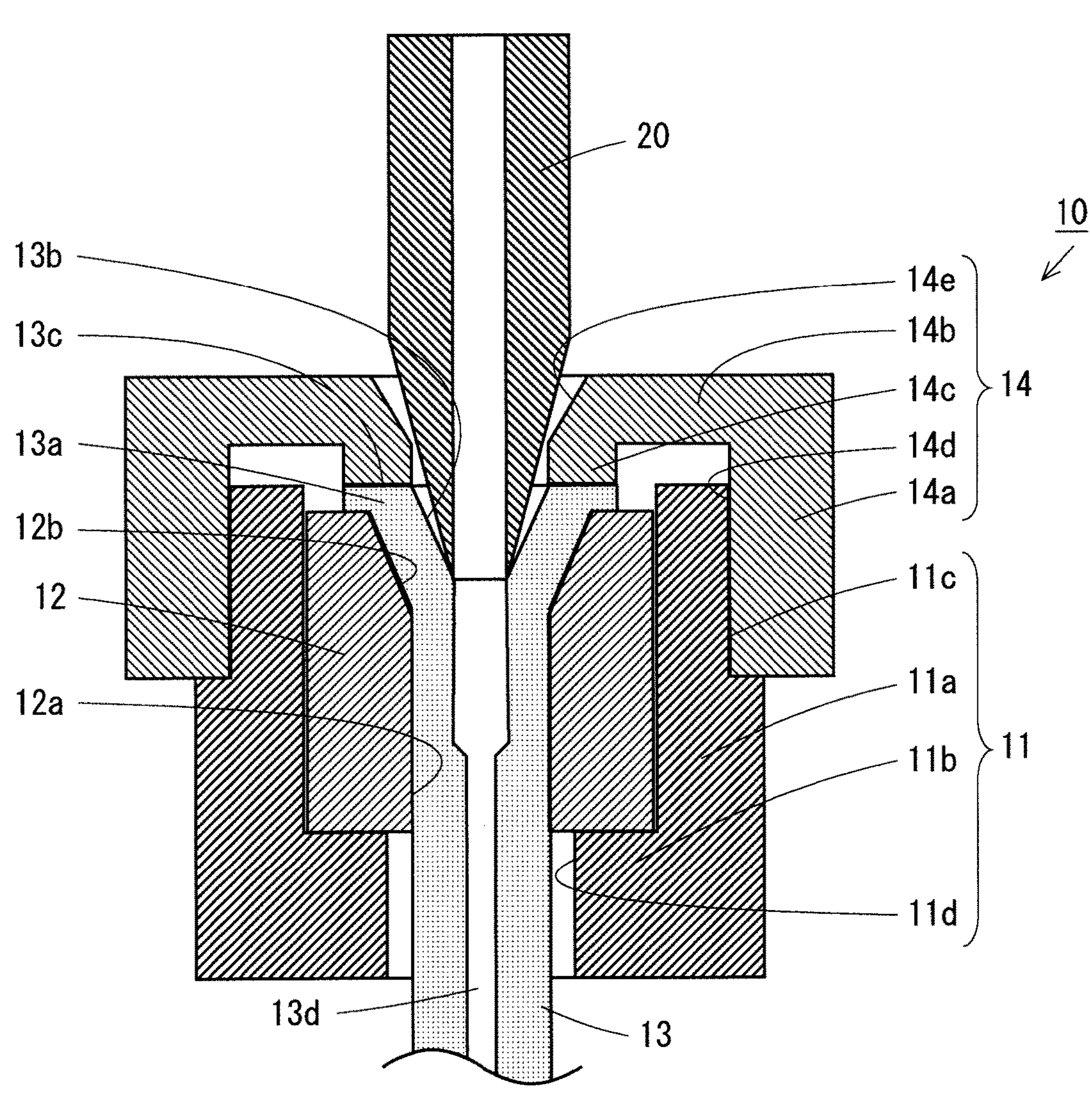
FIG. 6 is a longitudinal cross sectional view showing the injection port during the injecting operation.

FIG. 6 is a longitudinal cross sectional view showing the injection port 10 during the injecting operation. As shown in FIG. 6, during the injecting operation, the tip of the sampling needle 20 is put in the injection port 10 from the through hole 14*e* of the cap 14. In this case, the tip of the sampling needle 20 comes into contact with the tapered surface 13*b* of the widening portion 13*a* of the tube 13 while liquid-tightness is maintained. In this state, the mobile phase supplier 110 of FIG. 2 is operated, so that the sample is injected into the tube 13 together with the mobile phase. Thus, the sample is supplied to the separation column 140 of FIG. 2.

(3) Effects

In the injection port 10 according to the present embodiment, the sampling needle 20 for injecting a fluid into the flow path 13*d* is brought into contact with the widening portion 13*a* of the tube 13, so that the liquid-tightness between the sampling needle 20 and the tube 13 is maintained. Therefore, it is not necessary to provide a member such as a needle seal for maintaining the liquid-tightness between the sampling needle 20 and the flow path 13*d*. This reduces the number of components that form the injection port 10. As a result, it is possible to reduce the size and the cost of the injection port 10 and the sample supply device 100.

Further, in a case in which a needle seal and the tube 13 are connected to each other, a sample is likely to remain in a connecting portion, and a carryover where a sample used in a current analysis is detected in the next analysis is likely to occur. In contrast, with the above-mentioned configuration, a portion that connects the needle seal and the tube 13 to each other is not provided in the injection port 10. This can prevent a carryover.

The widening portion 13*a* of the tube 13 has the cover portion 13*c* that covers at least part of the upstream end surface of the cylindrical portion 12. In this case, it is possible to easily form the widening portion 13*a* in the tube 13. Further, the tube 13 can be easily positioned with respect to the cylindrical portion 12.

In the present example, the tube 13 is formed of PEEK. In this case, the widening portion 13*a* can be easily formed in the tube 13 by the thermal process or the like. Further, it is possible to easily enhance the liquid-tightness between the sampling needle 20 and the flow path 13*d*.

The cylindrical portion 12 is accommodated in the casing portion 11 while the downstream end portion of the tube 13 is drawn out. In this case, it is possible to easily install the injection port 10 at any installation location while protecting the cylindrical portion 12. Further, the cap 14 is attached to the casing portion 11. The tube 13 and the cylindrical portion 12 are fixed by the cap 14 while the inner peripheral surface of the upstream end portion of the tube 13 is exposed from the cap 14. Thus, it is possible to easily fix the tube 13 and the cylindrical portion 12.

(4) Other Embodiments (a) While the tube 13 is formed of PEEK in the above-mentioned embodiment, the embodiment is not limited to this. In a case in which the liquid-tightness between the sampling needle 20 and the tube 13 is sufficiently high, the tube 13 does not have to be formed of PEEK. Further, the tube 13 does not have to be formed of a resin material as long as the widening portion 13*a* can be formed in the tube 13.

(b) While the injection port 10 includes the casing portion 11 and the cap 14 in the above-mentioned embodiment, the embodiment is not limited to this. The injection port 10 does not have to have the cap 14 as long as the cylindrical portion 12 and the tube 13 can be appropriately fixed. Further, the injection port 10 does not have to have the casing portion 11 as long as the injection port 10 can be installed at any installation location.

(c) While the widening portion 13*a* of the tube 13 has the cover portion 13*c* in the above-mentioned embodiment, the embodiment is not limited to this. The widening portion 13*a* of the tube 13 does not have to have the cover portion 13*c*.

(5) Aspects

It is understood by those skilled in the art that the plurality of above-mentioned illustrative embodiments are specific examples of the below-mentioned aspects.

(Item 1) A fluid port structure according to one aspect that receives injection of a fluid may include a tube having sealability and having a flow path through which the fluid passes, and a cylindrical portion having a through hole, which extends in an axial direction in which the fluid flows and through which an upstream end portion of the tube is inserted, wherein an inner peripheral surface of the cylindrical portion may have a tapered surface, and the more upstream a position on the tapered surface is than a predetermined position in the axial direction, the larger a diameter of the through hole may be, and the tube may have a widening portion that widens along the tapered surface of the cylindrical portion in the upstream end portion.

In the fluid port structure, the injecting member for injecting a fluid to the flow path is brought into contact with the widening portion of the tube, so that the liquid-tightness between the injecting member and the tube is maintained. Therefore, it is not necessary to provide a member such as a needle seal for maintaining the liquid-tightness between the injecting member and the flow path. This reduces the number of components that forms the fluid port structure. As a result, it is possible to reduce the size and the cost of the fluid port structure.

(Item 2) The fluid port structure according to item 1, wherein the widening portion of the tube may have a cover portion that covers at least part of an upstream end surface of the cylindrical portion.

In this case, it is possible to easily form the widening portion in the tube. Further, the tube can be easily positioned with respect to the cylindrical portion.

(Item 3) The fluid port structure according to item 1 or 2, wherein the tube may be formed of a resin material.

In this case, it is possible to easily form the widening portion by performing a thermal process or the like.

(Item 4) The fluid port structure according to item 3, wherein the tube may be formed of polyether ether ketone.

In this case, it is possible to easily enhance the liquid-tightness between the injecting member and the tube.

(Item 5) The fluid port structure according to any one of items 1 to 4 may further include a casing portion that accommodates the cylindrical portion while drawing a downstream end portion of the tube outwardly.

In this case, it is possible to easily install the fluid port structure at any installation location while protecting the cylindrical portion.

(Item 6) The fluid port structure according to item 5, may further include a cap that is attached to the casing portion, and fixes the tube and the cylindrical portion while exposing an inner peripheral surface of the upstream end portion of the tube.

In this case, it is possible to easily fix the tube and the cylindrical portion.

(Item 7) A sample supply device according to another aspect may include the fluid port structure according to any one of items 1 to 6, and a sampling needle that injects a fluid sample to the flow path while being in contact with the widening portion of the tube in the fluid port structure.

In the sample supply device, it is not necessary to provide a member such as a needle seal for maintaining the liquid-tightness between the sampling needle and the flow path. Thus, it is possible to reduce the size and the cost of the sample supply device.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. A fluid port structure that receives injection of a fluid, comprising:

a tube having sealability and having a flow path through which the fluid passes;

a cylindrical portion having a through hole, which extends in an axial direction in which the fluid flows and through which an upstream end portion of the tube is inserted a casing portion that accommodates the cylindrical portion while drawing a downstream end portion of the tube outwardly; and a cap that is attached to the casing portion, wherein an inner peripheral surface of the cylindrical portion has a tapered surface, and the more upstream a position on the tapered surface than a predetermined position in the axial direction, the larger a diameter of the through hole, the tube has a widening portion that widens along the tapered surface of the cylindrical portion in the upstream end portion, and the cap fixes the tube and the cylindrical portion while exposing an inner peripheral surface of the upstream end portion of the tube by directly pressing the widening portion of the tube.

2. The fluid port structure according to claim 1, wherein the widening portion of the tube has a cover portion that covers at least part of an upstream end surface of the cylindrical portion.

3. The fluid port structure according to claim 1, wherein the tube is formed of a resin material.

4. The fluid port structure according to claim 3, wherein the tube is formed of polyether ether ketone.

5. A sample supply device comprising:

the fluid port structure according to claim 1; and a sampling needle that injects a fluid sample to the flow path while being in contact with the widening portion of the tube in the fluid port structure.

* * * * *